(12) United States Patent
Hadano et al.

(10) Patent No.: US 10,737,645 B2
(45) Date of Patent: Aug. 11, 2020

(54) VEHICLE FRONT STRUCTURE

(71) Applicant: Suzuki Motor Corporation, Hamamatsu-shi, Shizuoka (JP)

(72) Inventors: Akihiro Hadano, Shizuoka-Ken (JP); Yoshihiro Tanabe, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 40 days.

(21) Appl. No.: 16/011,052

(22) Filed: Jun. 18, 2018

(65) Prior Publication Data

US 2018/0361965 A1   Dec. 20, 2018

(30) Foreign Application Priority Data

Jun. 19, 2017   (JP) .................. 2017-119564

(51) Int. Cl.
  *B60R 19/18*   (2006.01)
  *B60R 19/24*   (2006.01)
  *B62D 21/15*   (2006.01)

(52) U.S. Cl.
  CPC .............. *B60R 19/18* (2013.01); *B60R 19/24* (2013.01); *B62D 21/152* (2013.01); *B60R 2019/1886* (2013.01); *B60R 2019/247* (2013.01)

(58) Field of Classification Search
  CPC ... B60R 19/18; B60R 19/24; B60R 2019/247; B60R 2019/1886; B62D 21/152; B62D 21/15
  USPC ..... 293/132, 133, 154, 155; 296/187.09, 29, 296/30
  See application file for complete search history.

(56) References Cited

U.S. PATENT DOCUMENTS

| 4,358,152 | A | * | 11/1982 | Mayer ................... B62D 33/06 180/89.1 |
| 9,421,865 | B2 | * | 8/2016 | Bernardi ............... B60K 5/1275 |
| 9,481,334 | B1 | * | 11/2016 | Matsumoto ............ B60R 19/34 |
| 2003/0015882 | A1 | | 1/2003 | Nagae et al. |
| 2004/0195862 | A1 | | 10/2004 | Saeki |

(Continued)

FOREIGN PATENT DOCUMENTS

| JP | 2014113894 A | 6/2014 |
| JP | 201730700 A | 2/2017 |

OTHER PUBLICATIONS

French Preliminary Search Report for FR1852775 dated Dec. 13, 2019.

*Primary Examiner* — Jason S Morrow
*Assistant Examiner* — E Turner Hicks
(74) *Attorney, Agent, or Firm* — Lerner, David, Littenberg, Krumholz & Mentlik, LLP

(57) ABSTRACT

A bumper member at a vehicle frontmost end is joined to side members. The bumper member has a curved shape, a center portion protrudes further to the vehicle front than a tip end portion of the side member, a projecting portion is positioned on the outer side of the tip end portion, and is curved toward the vehicle rear, a protruding part extending toward the side member is provided on an inner side of the projecting portion, a tip end portion on the inner side of the protruding part has a planar portion opposite a side face portion on the outer side of the side member, a protrusion protruding to the inner side from the planar portion and extending in the longitudinal direction is provided in the planar portion, and a slit-shaped opening into which a tip end of the protrusion is inserted is provided in the side face portion.

5 Claims, 4 Drawing Sheets

(56) References Cited

U.S. PATENT DOCUMENTS

| | | | | |
|---|---|---|---|---|
| 2014/0091585 A1* | 4/2014 | Ramoutar | ............... | B60R 19/24 |
| | | | | 293/133 |
| 2015/0298634 A1* | 10/2015 | Hara | ....................... | B60R 19/34 |
| | | | | 293/133 |
| 2016/0167712 A1* | 6/2016 | Ogawa | .................... | B60R 19/24 |
| | | | | 296/187.1 |
| 2017/0036699 A1 | 2/2017 | Asai | | |

* cited by examiner

VEHICLE FRONT STRUCTURE

CROSS-REFERENCE TO RELATED APPLICATIONS

This application claims the benefit of the filing date of Japanese Patent Application No. 2017-119564, filed on Jun. 19, 2017, the disclosure of which is hereby incorporated herein by reference.

TECHNICAL FIELD

The present invention relates to a vehicle front structure.

BACKGROUND ART

In a conventional vehicle front structure, a bumper member joined to front end parts of side members is arranged in the vehicle width direction, and extension parts extending outward in the vehicle width direction are provided on both ends in the vehicle width direction of the bumper member. Some vehicles including this type of vehicle front structure are configured such that, in a crash mode in which an impact load of a frontal crash is applied only to the extension parts of the bumper member, the impact load is transmitted to the side members through the extension parts.

For example, in a vehicle front structure of Patent Literature 1, a load receiving part is provided in an outer face in the vehicle width direction of a side member (side rail) arranged on both right and left sides, while a curved part curving toward the vehicle rear is provided on an outer part in the vehicle width direction of a bumper reinforcement positioned on the vehicle outer side of the side member. A brace protruding toward the vehicle rear and arranged on the inner side of the load receiving part with a gap interposed therebetween is coupled on a rear face of the curved part. In this configuration, when an impact load is input to the outer part in the vehicle width direction of the bumper reinforcement positioned on the vehicle outer side of the side member, the impact load is transmitted to the side member through the brace.

BRIEF SUMMARY OF THE INVENTION

Problems to be Solved by the Invention

However, in the above-mentioned conventional vehicle front structure, the load receiving part is provided in a side rail outer constituting the outer face of the side rail, and is formed into a recess which is recessed inward in the vehicle width direction from a vertical wall part of the side rail outer. Hence, if the recess of the load receiving part is formed shallow, at the time of an offset crash where the impact load is applied only to the curved part of the bumper reinforcement and deforms and pushes the curved part in toward the vehicle rear, a tip end portion of the brace may come off the load receiving part. Accordingly, the brace may be unable to reliably transmit the impact load to the side member. On the other hand, if the recess of the load receiving part is formed deep, stiffness of the side rail outer constituting the outer face of the side rail is reduced. Accordingly, at the time of a full overlap crash in which the impact load is applied to a center part of the bumper reinforcement, the side rail may deform toward the vehicle inner side.

The present invention has been made in view of the foregoing, and aims to provide a vehicle front structure that, at the time of an offset crash on a bumper member, can support shifting of both vehicle end parts of the bumper member toward the vehicle rear without adding a fixing member or a complex structure, and also, at the time of a full overlap crash on the bumper member, can absorb impact on a side member without hindering deformation of the bumper member.

Means for Solving the Problems

To solve the above problems of the conventional technique, the present invention is a vehicle front structure including: side members extending in a vehicle longitudinal direction, and arranged on both sides of a vehicle; and a bumper member extending in a vehicle width direction and arranged at a vehicle frontmost end, a vehicle rear side of the bumper member being joined to the side members, the bumper member being formed into a curved shape, a vehicle center part positioned between the side members protruding further to the vehicle front than tip end portions of the side members, and both vehicle end parts being positioned on the outer side in the vehicle width direction of the tip end portions of the side members, and having a curved shape curving toward the vehicle rear, in which: protruding parts extending toward the side members from the both vehicle end parts of the bumper member are provided on an inner side in the vehicle width direction of the both vehicle end parts, a tip end portion on the vehicle inner side of the protruding part having a planar portion opposite to a side face portion on the vehicle outer side of the side member; a protrusion protruding further to the vehicle inner side from the planar portion of the protruding part and extending in the vehicle longitudinal direction is provided in the planar portion; and a slit-shaped opening formed in a position corresponding to the protrusion, formed long in the vehicle longitudinal direction, and into which a tip end of the protrusion is inserted, is provided in the side face portion on the vehicle outer side of the side member.

Advantageous Effects of Invention

As described above, the vehicle front structure of the present invention includes: side members extending in a vehicle longitudinal direction, and arranged on both sides of a vehicle; and a bumper member extending in a vehicle width direction and arranged at a vehicle frontmost end, a vehicle rear side of the bumper member being joined to the side members, the bumper member being formed into a curved shape, a vehicle center part positioned between the side members protruding further to the vehicle front than tip end portions of the side members, and both vehicle end parts being positioned on the outer side in the vehicle width direction of the tip end portions of the side members, and having a curved shape curving toward the vehicle rear. Protruding parts extending toward the side members from the both vehicle end parts of the bumper member are provided on an inner side in the vehicle width direction of the both vehicle end parts, a tip end portion on the vehicle inner side of the protruding part having a planar portion opposite to a side face portion on the vehicle outer side of the side member; a protrusion protruding further to the vehicle inner side from the planar portion of the protruding part and extending in the vehicle longitudinal direction is provided in the planar portion; and a slit-shaped opening formed in a position corresponding to the protrusion, formed long in the vehicle longitudinal direction, and into which a tip end of the protrusion is inserted, is provided in the side face portion on the vehicle outer side of the side member.

Accordingly, in the vehicle front structure of the present invention, at the time of an offset crash which is a mode in which a crash object crashes into an end part on one side of the vehicle front part, the end part on the vehicle outer side of the side member, of the bumper member on the crashed side is bent inward toward the vehicle rear. Then, the rear end of the slit-shaped opening of the side member and the rear end of the protrusion of the protruding part are brought into contact along with the deformation of the bumper member. Accordingly, shifting of both vehicle end parts of the bumper member toward the vehicle rear can be supported without newly adding a fixing member or a complex structure. Moreover, deformation of the bumper member and deformation of the tip end portion of the side member can be suppressed as well. This suppression of deformation of the bumper member and the like enables smooth load transmission to the side member, so that deformation of the side member toward the vehicle compartment can be suppressed, and damage can be reduced.

Additionally, in the vehicle front structure of the present invention, at the time of a full overlap crash which is a mode where a crash object crashes into the entire face of the vehicle front part, both vehicle end parts of the bumper member rotate toward the vehicle front around the side face portions on the vehicle outer side of the side members, and the protrusions of the protruding part come off the slit-shaped openings of the side member along with the deformation of the bumper member. Since the engagement between the protrusions and the openings can be easily and reliably released, deformation of the bumper member is not hindered, and impact load can be absorbed by the side member, whereby the ability of reducing damage of a full overlap crash can be enhanced effectively. That is, the vehicle front structure of the present invention is capable of absorbing impact in both of two crash modes including a full overlap crash and an offset crash.

Additionally, in the vehicle front structure of the present invention, the protrusion is formed into a long shape extending in the vehicle longitudinal direction. Hence, sufficient strength and stiffness can be ensured against a load in the vehicle longitudinal direction generated by contact with the slit-shaped opening of the side member, and the protrusion can be designed to be light in weight.

DETAILED DESCRIPTION

Mode for Carrying Out the Invention

Figure 1:
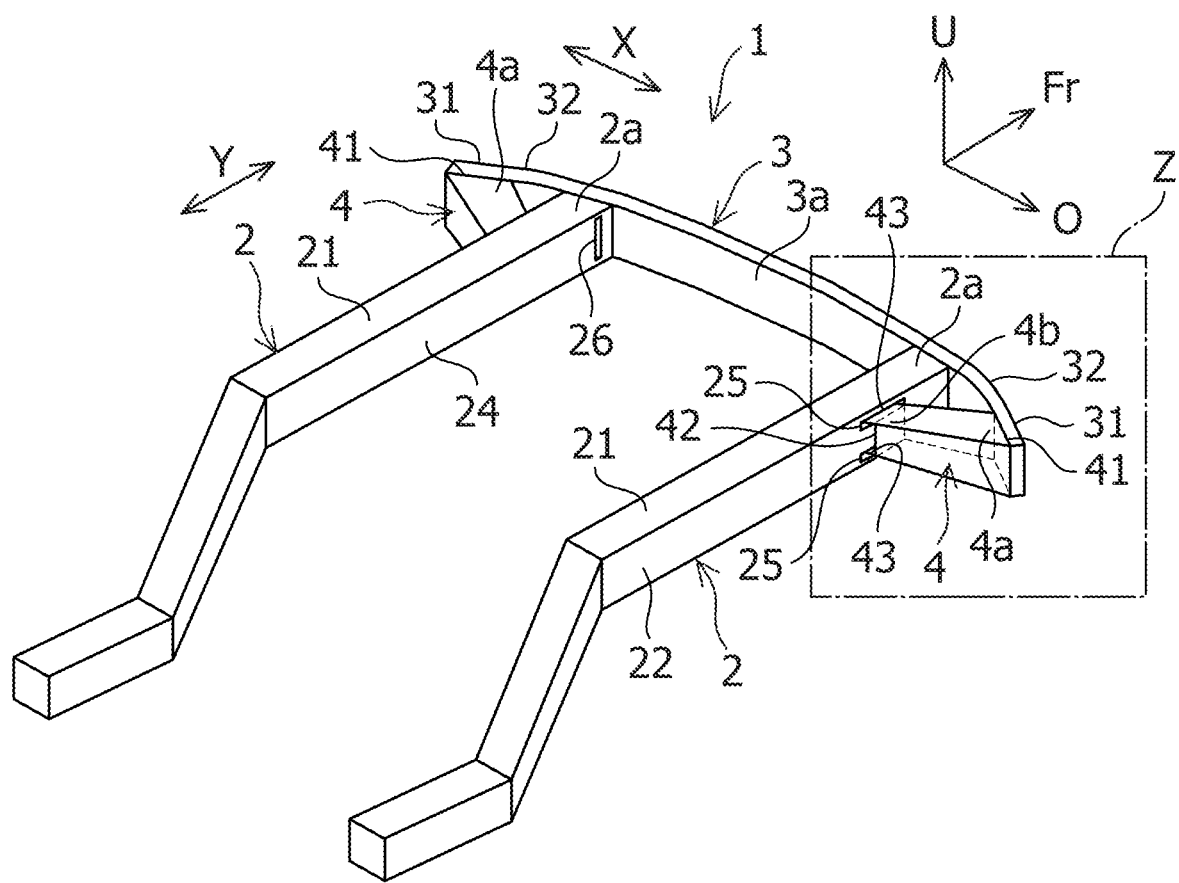
FIG. 1 is a perspective view of a bumper member and side members to which a vehicle front structure of an embodiment of the present invention is applied, as viewed from a vehicle rear-obliquely upper direction.

Hereinafter, the present invention will be described in detail based on an embodiment illustrated in the drawings.

FIGS. 1 to 6 illustrate a vehicle front structure of the embodiment of the present invention. Note that in the drawings, arrow Fr indicates the vehicle front, arrow O indicates the outer side of the vehicle, and arrow U indicates the upper direction of the vehicle. Also, arrow X indicates the vehicle width direction, and arrow Y indicates the vehicle longitudinal direction.

Figure 2:
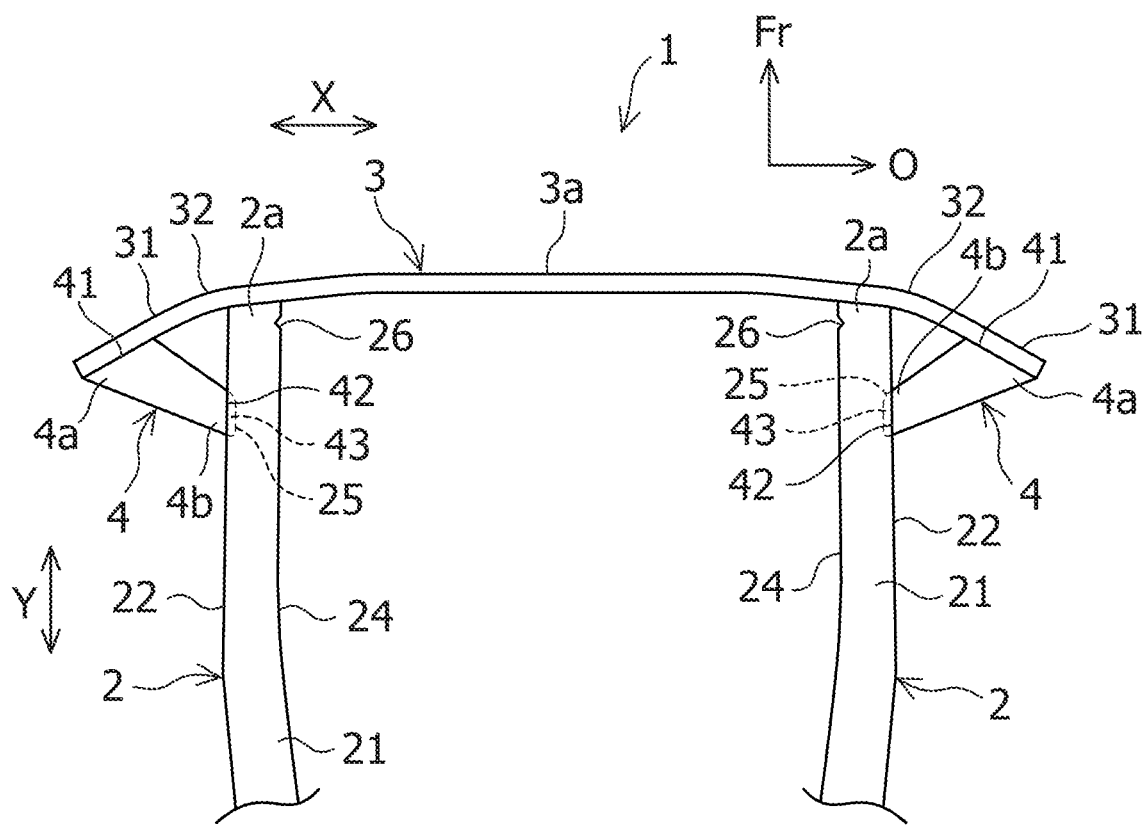
FIG. 2 is a plan view of the bumper member and side members to which the vehicle front structure of the embodiment of the present invention is applied, as viewed from the upper direction of the vehicle.
Figure 3:
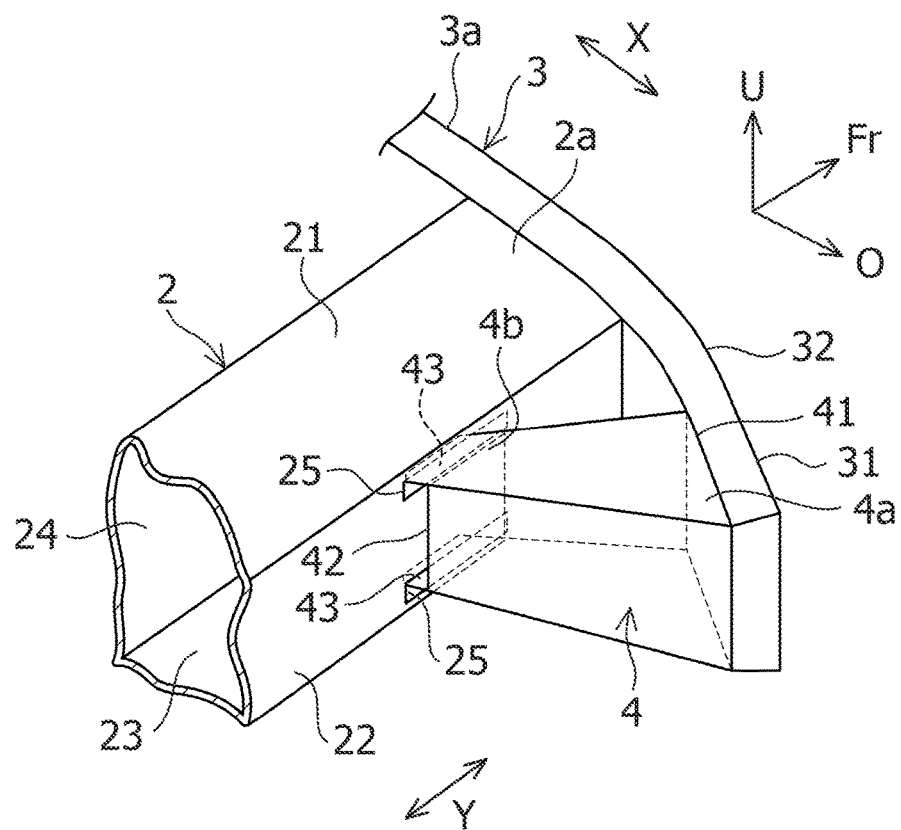
FIG. 3 is an enlarged perspective view of part Z of FIG. 1.
Figure 4:
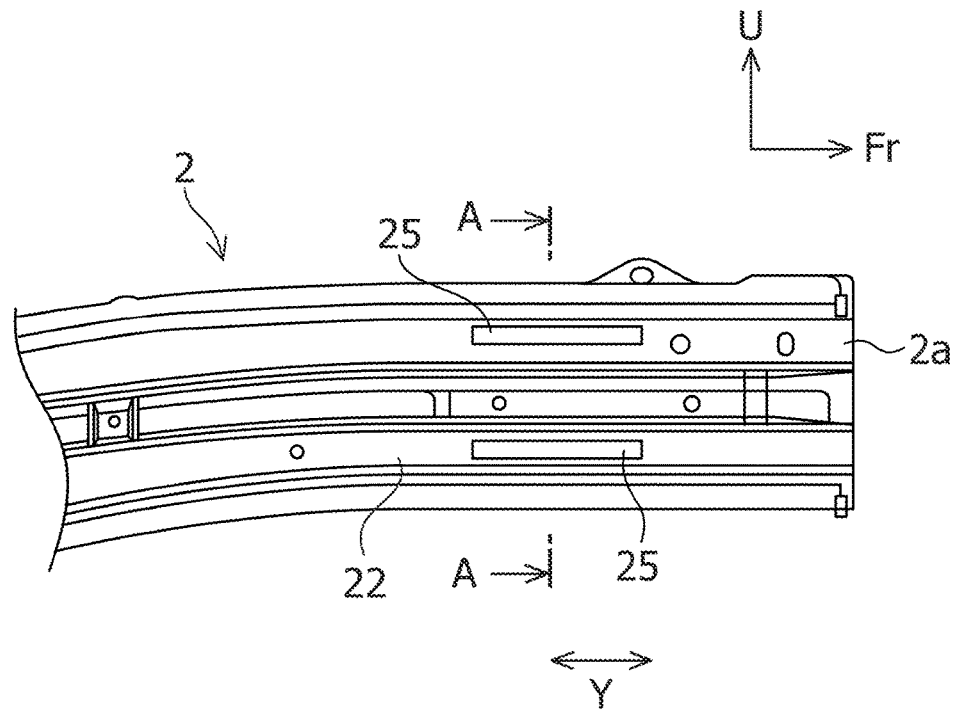
FIG. 4 is a perspective view of the side member to which the vehicle front structure of the embodiment of the present invention is applied, as viewed from the vehicle outer side.

As illustrated in FIGS. 1 to 3, a vehicle front part 1 to which a structure of the embodiment of the present invention is applied mainly has: side members (front side members) 2 that extend in the vehicle longitudinal direction, and are respectively arranged on both side parts of the vehicle; and a bumper member 3 that extends in the vehicle width direction and is arranged at a vehicle frontmost end, a vehicle rear side of the bumper member 3 being joined to the side members 2.

Figure 5:
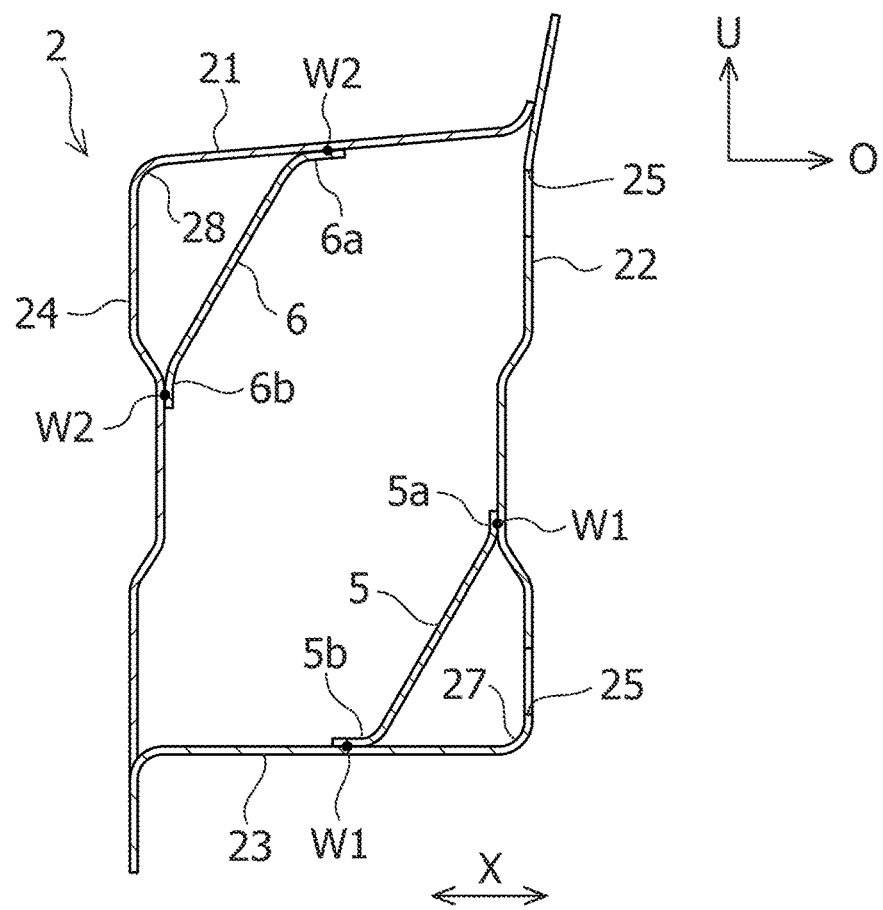
FIG. 5 is a cross-sectional view taken along line A-A of FIG. 4.

As illustrated in FIGS. 3 and 5, the side member 2 of the embodiment has a closed cross section surrounded by an upper face portion 21, a side face portion 22 on the vehicle outer side, a bottom face portion 23, and a side face portion 24 on the vehicle inner side. Slit-shaped openings 25 that are formed in positions corresponding to below-mentioned protrusions, formed long in the vehicle longitudinal direction, and into which tip ends of the protrusions are inserted, are provided in parallel and spaced apart from each other in the vertical direction, in the side face portion 22 on the vehicle outer side positioned closer to a tip end portion 2a of the side member 2.

As illustrated in FIGS. 1 to 3, the bumper member 3 of the embodiment is formed into a curved shape, and a vehicle center portion 3a positioned between both of the right and left side members 2 protrudes further to the vehicle front than the tip end portions 2a of the side members 2. Moreover, projecting portions (both vehicle end parts) 31 projecting further outward in the vehicle width direction than the tip end portions 2a of the side members 2, having a curved shape tilted toward the vehicle rear, and extending over a predetermined length, are provided on both ends in the vehicle width direction of the bumper member 3. In other words, the bumper member 3 has a curved shape protruding toward the vehicle front at the vehicle center portion 3a as a vertex, and has a curved portion 32 curving toward the vehicle rear on an outer part of the side member 2. This shortens the length of the bumper member 3 in the vehicle width direction, and enables a compact design of the configuration. Additionally, the distance between the projecting portions 31 of both vehicle end parts of the bumper member 3 and the side face portions 22 on the vehicle outer side of the side members 2 is shortened, to reduce the size of the later-mentioned protruding parts and suppress increase in weight. Furthermore, a larger angle (around 90 degrees) can be formed between the projecting portions 31 of both vehicle end parts of the bumper member 3 and the below-mentioned protruding parts.

As illustrated in FIGS. 1 to 3, protruding parts 4 respectively extending from the projecting portions 31 toward the side members 2 on both right and left sides in such a manner as to intersect therewith, are arranged on the inner side in the vehicle width direction (vehicle rear side) positioned on tip end portions of the projecting portions 31 of the bumper member 3 of the embodiment. Each protruding part 4 is formed into a substantially rectangular box structure in plan view, and has a wedge shape whose sectional area on the side member 2 side is smaller than the sectional area on the bumper member 3 side. The protruding part 4 has: an arrangement portion 41 where a base end portion 4a on the vehicle outer side is arranged by being attached to an inner wall face of the projecting portion 31 of the bumper member 3; and a planar portion 42 where a tip end portion 4b on the vehicle inner side is arranged close to the side face portion 22 on the vehicle outer side of the side member 2, and is opposite and parallel to the side face portion 22.

In addition, as illustrated in FIGS. 1 to 3, multiple (two in the embodiment) protrusions 43 that protrude further to the vehicle inner side from the planar portion 42 toward the side face portion 22 on the vehicle outer side of the side member 2, are inserted into the slit-shaped openings 25 of the side member 2 in a normal state, and have a length in the vehicle width direction that allows placement inside the side member 2, are provided in the planar portion 42 of the protruding part 4. That is, the protrusions 43 and the openings 25 are provided in corresponding positions, shapes, sizes, and numbers. Hence, the protrusions 43 are formed of a plate-like body extending in the vehicle longitudinal direction and having a thickness and length in the vehicle longitudinal direction that allow insertion into the slit-shaped opening 25. Thus, the protrusions 43 are configured to ensure sufficient strength and stiffness against a load in the vehicle longitudinal direction generated by contact with the side member 2, and to reduce weight.

What is more, a vehicle front end part of the slit-shaped opening 25 of the side member 2 is positioned closer to the vehicle rear than the projecting portion 31 of both vehicle end parts of the bumper member 3. A tip end portion on the vehicle rear side of the protrusion 43 is positioned on the vehicle front side of the rear end of the slit-shaped opening 25, when the protrusion 43 is inserted in the side member 2. Accordingly, at the time of a full overlap crash on the vehicle front part 1, when the projecting portion 31 of the bumper member 3 rotates toward the vehicle front around the side face portion 22 on the vehicle outer side of the side member 2, the protrusion 43 of the protruding part 4 is allowed to more easily come off the slit-shaped opening 25 of the side member 2.

Furthermore, as illustrated in FIGS. 1 and 3 to 5, the protrusions 43 of the embodiment are spaced apart from each other in the vehicle vertical direction on the tip end portion 4b on the vehicle inner side of the protruding part 4, and are respectively provided on the upper end and lower end of the protruding part 4 while sandwiching the planar portion 42 of the protruding part 4. Hence, in this structure, the protrusions 43 are arranged with a sufficient spacing interposed therebetween on the planar portion 42 of the protruding part 4, whereby the load of a crash is distributed, and the protruding part 4 is less likely to deform. Additionally, the protrusions 43 are arranged close to the upper face portion 21 and the bottom face portion 23 which are upper and lower faces of the side member 2. Hence, sufficient strength of the side member 2 is also ensured in this configuration.

Meanwhile, stiffness of the side face portion 24 (vehicle inner face) positioned on the vehicle inner side of the tip end portion 2a of the side member 2 of the embodiment is set lower than that of the side face portion 22 (vehicle outer face) positioned on the vehicle outer side. Hence, as illustrated in FIGS. 1 and 2, a vulnerable portion 26 such as a longitudinal bead extending in the vehicle vertical direction is provided in each side face portion 24 on the vehicle inner side of the tip end portion 2a. When the vulnerable portion 26 is provided, the side member 2 easily deforms toward the vehicle inner side at the time of a crash on the bumper member 3 on the vehicle inner side of the side member 2. As a result, the bumper member 3 more easily deforms toward the vehicle inner side, and the engagement between the slit-shaped opening 25 and the tip end of the protrusion 43 is released smoothly. Accordingly, absorption of an impact load of a crash by deformation of the side member 2 is less likely to be hindered.

Figure 6:
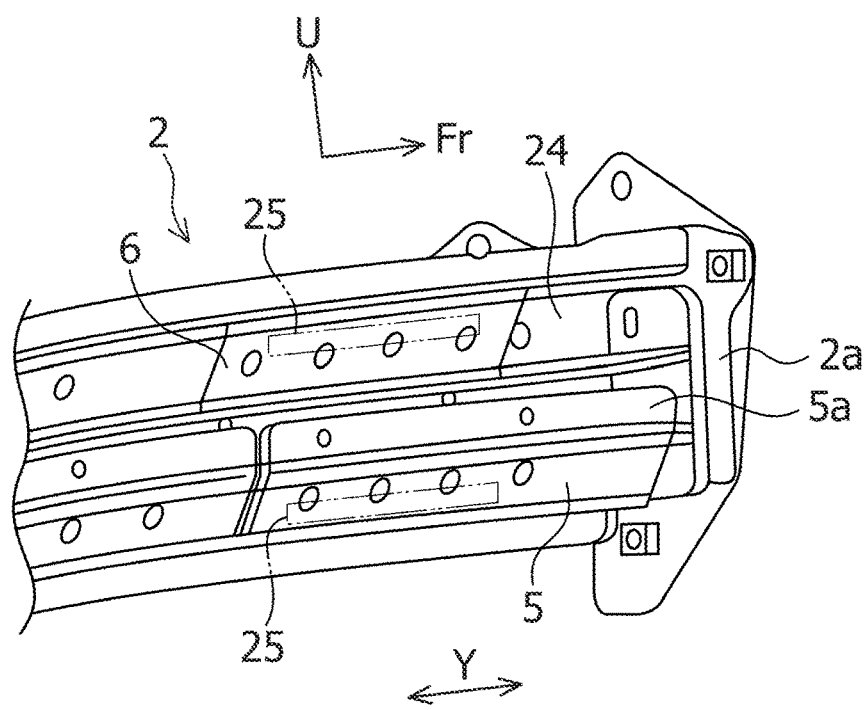
FIG. 6 is a perspective view of the side member of FIG. 4, from which a side face portion on the vehicle outer side is removed.

In addition, as illustrated in FIGS. 5 and 6, a plate-shaped lower reinforcement 5 extending in the longitudinal direction of the side member 2 is arranged in an inner lower side of the side member 2 of the embodiment. The lower reinforcement 5 is tilted while straddling a lower corner portion 27 formed of the side face portion 22 on the vehicle outer side and the bottom face portion 23 of the side member 2, and upper and lower end portions 5a, 5b of the lower reinforcement 5 are respectively joined to the side face portion 22 and the bottom face portion 23. For this reason, in the lower reinforcement 5, the upper and lower end portions 5a, 5b as joining parts are bent along the side face portion 22 and the bottom face portion 23, and the upper and lower end portions 5a, 5b have multiple fixing points W1 in the side face portion 22 on the vehicle outer side of the side member 2 and the bottom face portion 23. Moreover, the slit-shaped opening 25 positioned on the lower side is provided opposite to the lower reinforcement 5, in a position sandwiched between the fixing points W1 of the upper and lower end portions 5a, 5b of the lower reinforcement 5.

That is, in the side member 2 of the embodiment, the part of the side face portion 22 on the vehicle outer side that comes into contact with the protruding part 4 at the time of an offset crash is reinforced by the lower reinforcement 5. Thus, the side member 2 is configured to, at the time of an offset crash where the planar portion 42 of the protruding part 4 comes into contact with the side face portion 22 of the side member 2, suppress excessive deformation of the side member 2 toward the vehicle inner side, and maintain the shape of the slit-shaped opening 25 positioned on the lower side.

Further, as illustrated in FIGS. 5 and 6, a plate-shaped upper reinforcement 6 extending in the longitudinal direction of the side member 2 is arranged in an inner upper side of the side member 2 of the embodiment. The upper reinforcement 6 is tilted while straddling an upper corner portion 28 formed of the upper face portion 21 and the side face portion 24 on the vehicle inner side of the side member 2, and upper and lower end portions 6a, 6b of the upper reinforcement 6 are respectively joined to the upper face portion 21 and the side face portion 24. For this reason, in the upper reinforcement 6, the upper and lower end portions 6a, 6b as joining parts are bent along the upper face portion 21 and the side face portion 24, and the upper and lower end portions 6a, 6b have multiple fixing points W2 in the upper face portion 21 and the side face portion 24 on the vehicle inner side of the side member 2. Moreover, the slit-shaped opening 25 positioned on the upper side is provided opposite to the upper reinforcement 6, in a position sandwiched between the fixing points W2 of the upper and lower end portions 6a, 6b of the upper reinforcement 6.

That is, in the side member 2 of the embodiment, the part of the upper face portion 21 joined to the side face portion 22 on the vehicle outer side that comes into contact with the protruding part 4 at the time of an offset crash is reinforced by the upper reinforcement 6. Thus, the side member 2 is configured to, at the time of an offset crash where the planar portion 42 of the protruding part 4 comes into contact with the side face portion 22 of the side member 2, suppress excessive deformation of the side member 2 toward the vehicle inner side, and maintain the shape of the slit-shaped opening 25 positioned on the upper side.

Next, a description will be given of an operation of the vehicle front structure of the embodiment, at the time of an offset crash which is a mode of a crash on one side of the vehicle front part 1.

When an impact load is input into an end part on one side of the bumper member 3, and the projecting portion 31 at the end part of the bumper member 3 is pushed in toward the vehicle rear, the projecting portion 31 is caused to rotate toward the vehicle rear around the vicinity of the vehicle center. However, the planar portion 42 on the vehicle inner side of the protruding part 4 provided on the inner side of the projecting portion 31 comes into contact with the side face portion 22 on the vehicle outer side of the side member 2, and therefore suppresses rotation of the projecting portion 31 toward the vehicle rear. Moreover, the protrusions 43 are provided in the planar portion 42 on the vehicle inner side of the protruding part 4, the protrusions 43 are inserted into the slit-shaped openings 25 provided in the side face portion 22 on the vehicle outer side of the side member 2, and the protruding part 4 does not move in the vehicle longitudinal direction relative to the side member 2. This suppresses deformation of the tip end portion 2a of the side member 2. Accordingly, an impact load input into an end part on one side of the bumper member 3 is transmitted to the side member 2 through the protruding part 4. Hence, the end part of the bumper member 3 and the side member 2 do not bend into the vehicle compartment, but deform in a suppressed manner. Meanwhile, the protruding part 4 does not deform entirely, and only the contact point with the side member 2 and peripheral parts deform.

Additionally, a description will be given of an operation of the vehicle front structure of the embodiment, at the time of a full overlap crash which is a mode of a crash on the entire face of the vehicle front part 1.

When an impact load is input into the entire bumper member 3 having a curved shape and the entire bumper member 3 is pushed in toward the vehicle rear, since the vehicle center portion 3a positioned between the side members 2 protrudes further to the vehicle front than the tip end portions 2a of the side members 2, the projecting portion 31 on the end part of the bumper member 3 rotates toward the vehicle front around the side face portion 22 on the vehicle outer side of the side member 2, when the vehicle center portion 3a deforms linearly. Accordingly, the protrusions 43 that were inserted into the side member 2 come off the slit-shaped openings 25, and the engagement with the openings 25 is released. Then, when load is further applied, the tip end portion 2a of the side member 2 is allowed to deform and absorb the impact load, since the side member 2 and the protruding part 4 do not interfere with each other. During this deformation, the projecting portion 31 of the bumper member 3 rotates toward the vehicle front around the side face portion 22 on the vehicle outer side of the side member 2, and therefore the protruding part 4 having the protrusions 43 does not penetrate and interfere with the side face portion 22 on the vehicle outer side of the side member 2. At this time, if the vulnerable portion 26 is added to the side face portion 24 on the vehicle inner side positioned in the tip end portion 2a of the side member 2, deformation of the tip end portion 2a of the side member 2 is prompted even more, and impact load can be absorbed more effectively.

Thus, the vehicle front structure of the embodiment of the present invention includes: the side member 2 that extends in the vehicle longitudinal direction in the vehicle front part 1, and is arranged in both side parts of the vehicle; and a bumper member 3 that extends in the vehicle width direction and is arranged at a vehicle frontmost end, a vehicle rear side of the bumper member 3 being joined to the side members 2. The bumper member 3 is formed into a curved shape, the vehicle center portion 3a positioned between the side members 2 protrude further to the vehicle front than the tip end portions 2a of the side members 2, and the projecting portions 31 of both vehicle end parts are positioned on the outer side in the vehicle width direction of the tip end portions 2a of the side members 2, and have a curved shape curving toward the vehicle rear. Moreover, the protruding part 4 extending toward the side member 2 from the projecting portion 31 of the bumper member 3 is provided on the inner side in the vehicle width direction of the projecting portion 31, and the tip end portion 4b on the vehicle inner side of the protruding part 4 has the planar portion 42 opposite to the side face portion 22 on the vehicle outer side of the side member 2. The protrusions 43 protruding further to the vehicle inner side from the planar portion 42 of the protruding part 4 and extending in the vehicle longitudinal direction are provided in the planar portion 42, and the slit-shaped openings 25 formed in positions corresponding to the protrusions 43, formed long in the vehicle longitudinal direction, and into which tip ends of the protrusions 43 are inserted, are provided in the side face portion 22 on the vehicle outer side of the side member 2.

Hence, in the vehicle front structure of the embodiment, at the time of an offset crash which is a mode in which a crash object crashes into an end part on one side of the vehicle front part 1, the projecting portion 31 which is the bumper member 3 on the crashed side and is the end part on the vehicle outer side of the side member 2 is bent inward toward the vehicle rear. Then, the rear end of the slit-shaped opening 25 of the side member 2 and the rear end of the protrusion 43 of the protruding part 4 are brought into contact along with the deformation of the projecting portion 31 of the bumper member 3. Accordingly, the vehicle front structure of the present invention can support shifting of the projecting portion 31 on the vehicle end part of the bumper member 3 toward the vehicle rear, without newly adding a fixing member or a complex structure. Moreover, deformation of the bumper member 3 and deformation of the tip end portion 2a of the side member 2 can be suppressed as well. This enables smooth load transmission from the projecting portion 31 of the bumper member 3 to the side member 2 through the protruding part 4, so that deformation of the side member 2 into the vehicle compartment can be suppressed.

Meanwhile, in the vehicle front structure of the embodiment, at the time of a full overlap crash which is a mode where a crash object crashes into the entire face of the vehicle front part 1, the projecting portions 31 of both vehicle end parts of the bumper member 3 rotate toward the vehicle front around the side face portions 22 on the vehicle outer side of the side members 2, and the protrusions 43 of the protruding part 4 come off the slit-shaped openings 25 of the side member 2 along with the deformation of the bumper member 3.

Accordingly, the vehicle front structure of the present invention can easily and surely release the engagement between the protrusions 43 and the openings 25 at the time of a full overlap crash. This allows absorption of impact load by the side member 2 without hindering deformation of the bumper member 3, whereby the ability of reducing damage of a full overlap crash can be enhanced effectively.

That is, the vehicle front structure of the embodiment is capable of absorbing impact in both of two crash modes including a full overlap crash and an offset crash, by a simple structure.

Additionally, in the vehicle front structure of the embodiment, the protrusion 43 is formed into a long shape extending in the vehicle longitudinal direction. Hence, sufficient strength and stiffness can be ensured against a load in the vehicle longitudinal direction generated by contact with the slit-shaped opening 25 of the side member 2, and the protrusion 43 can be designed to be light in weight.

Additionally, in the vehicle front structure of the embodiment, the protrusions 43 are spaced apart from each other in the vehicle vertical direction, on the tip end portion 4b on the vehicle inner side of the protruding part 4, and are provided on the upper end and lower end of the protruding part 4 while sandwiching the planar portion 42 of the protruding part 4. Hence, in this structure, the protrusions 43 are arranged with a sufficient spacing ensured therebetween on the planar portion 42 of the protruding part 4, whereby the load of a crash is distributed, and the protruding part 4 is less likely to deform. Additionally, the protrusions 43 can be arranged close to the upper face portion 21 and the bottom face portion 23 which are upper and lower faces of the side member 2. Hence, sufficient strength of the side member 2 is also ensured, and a structure less likely to be deformed by a crash can be achieved.

Further, in the vehicle front structure of the embodiment, the bumper member 3 has a curved shape protruding toward the vehicle front at the vehicle center portion 3a as a vertex, and has the curved portion 32 curving toward the vehicle rear on an outer part of the side member 2. This shortens the length of the bumper member 3 in the vehicle width direction, and enables a compact design. Additionally, the distance between the projecting portions 31 of both vehicle end parts of the bumper member 3 and the side face portions 22 on the vehicle outer side of the side members 2 is shortened, so that the size of the protruding part 4 can be reduced for compactness, and weight increase can be suppressed. Moreover, a larger angle can be formed between the projecting portions 31 of both vehicle end parts of the bumper member 3 and the protruding parts 4. Hence, a load of an offset crash can be transmitted effectively from the projecting portion 31 to the side member 2.

In the vehicle front structure of the embodiment, the stiffness of the side face portion 24 on the vehicle inner side of the tip end portion 2a of the side member 2 is set lower than that of the side face portion 22 on the vehicle outer side by forming the vulnerable portion 26. Hence, at the time of a crash on the bumper member 3 on the vehicle inner side of the side member 2, the side member 2 more easily deforms toward the vehicle inner side, and the engagement between the slit-shaped opening 25 and the tip end of the protrusion 43 is smoothly and surely released. Accordingly, impact can be absorbed by deformation of the side member 2, at the time of a full overlap crash.

Additionally, in the vehicle front structure of the embodiment, the side member 2 has a closed cross section surrounded by the upper face portion 21, the side face portion 22 on the vehicle outer side, the bottom face portion 23, and the side face portion 24 on the vehicle inner side, the lower reinforcement 5 extending in the longitudinal direction of the side member 2 is arranged inside the side member 2, the lower reinforcement 5 has the fixing points W1 in the side face portion 22 on the vehicle outer side and the bottom face portion 23 of the side member 2, and the slit-shaped opening 25 is provided in a position sandwiched by the fixing points W1 of the lower reinforcement 5. Accordingly, in the vehicle front structure of the embodiment, the part of the side face portion 22 on the vehicle outer side of the side member 2 that comes into contact with the protruding part 4 at the time of an offset crash is reinforced by the lower reinforcement 5. Since the part of the side face portion 22 on the vehicle outer side of the side member 2 that comes into contact with the protruding part 4 at the time of an offset crash is reinforced by the lower reinforcement 5, at the time of an offset crash where the planar portion 42 of the protruding part 4 comes into contact with the side face portion 22 of the side member 2, deformation of the side member 2 toward the vehicle inner side can be suppressed, and the shape of the slit-shaped opening 25 positioned on the lower side can be maintained. This can reduce damage of an offset crash even more effectively.

Although the embodiment of the present invention has been described, the invention is not limited to the above embodiment, and various modifications and changes can be made based on the technical idea of the invention.

For example, although the protruding part 4 of the above embodiment is formed into a box structure, it may have a U-shaped cross section with an open lower side. Also, the protruding part 4 does not necessarily have to be hollow, and a honeycomb structure or the like for enhancing stiffness may fill the inside of the protruding part 4.

REFERENCE SIGNS LIST 1 vehicle front part
2 side member
2a tip end portion
3 bumper member
3a vehicle center portion
4 protruding part
4a base end portion
4b tip end portion
5 lower reinforcement
5a upper end portion
5b lower end portion
21 upper face portion
22 side face portion on the vehicle outer side
23 bottom face portion
24 side face portion on the vehicle inner side
25 slit-shaped opening
26 vulnerable portion
27 lower corner portion
31 projecting portion
32 curved portion
41 arrangement portion
42 planar portion
43 protrusion
W1 fixing point

The invention claimed is:

1. A vehicle front structure comprising:
   side members extending in a vehicle longitudinal direction, and arranged on both sides of a vehicle; and
   a bumper member extending in a vehicle width direction and arranged at a vehicle frontmost end, a vehicle rear side of the bumper member being joined to the side members,
   the bumper member being formed into a curved shape, a vehicle center part positioned between the side members protruding further to the vehicle front than tip end portions of the side members, and both vehicle end parts being positioned on the outer side in the vehicle width direction of the tip end portions of the side members, and having a curved shape curving toward the vehicle rear, characterized in that:

protruding parts extending toward the side members from the both vehicle end parts of the bumper member are provided on an inner side in the vehicle width direction of the both vehicle end parts, a tip end portion on the vehicle inner side of the protruding part having a planar portion opposite to a side face portion on the vehicle outer side of the side member;

two protrusions protruding further to the vehicle inner side from the planar portion of the protruding part and extending in the vehicle longitudinal direction are provided in the planar portion;

two slit-shaped openings formed in positions corresponding to the protrusions, formed long in the vehicle longitudinal direction, and into which tip ends of the protrusions are inserted, are provided in the side face portion on the vehicle outer side of the side member; and a vehicle rear edge of the tip end of each of the protrusions is positioned on a vehicle front side of a vehicle rear end of the slit-shaped opening, when the protrusions are inserted in the side member.

2. The vehicle front structure according to claim 1, characterized in that the protrusions are spaced apart from each other in a vehicle vertical direction, on the tip end portion on the vehicle inner side of the protruding part, and are provided on the upper end and lower end of the protruding part while sandwiching the planar portion of the protruding part.

3. The vehicle front structure according to claim 1, characterized in that the bumper member has a curved shape protruding toward the vehicle front at the vehicle center part as a vertex, and has a curved part curving toward the vehicle rear on an outer part of the side member.

4. The vehicle front structure according to claim 1, characterized in that a stiffness of a face on the vehicle inner side of the tip end portion of the side member is set lower than that of a face on the vehicle outer side.

5. The vehicle front structure according to claim 1, characterized in that the side member has a closed cross section, a reinforcement extending in the longitudinal direction of the side member being arranged inside the side member, the reinforcement having fixing points in an outer face and a bottom face of the side member, and the slit-shaped opening being provided in a position sandwiched by the fixing points of the reinforcement.

* * * * *